United States Patent
Bendtsen et al.

(10) Patent No.: US 10,383,188 B2
(45) Date of Patent: Aug. 13, 2019

(54) LED LUMINAIRE

(71) Applicant: Cree, Inc., Durham, NC (US)

(72) Inventors: Andrew Dan Bendtsen, Milwaukee, WI (US); Kurt S. Wilcox, Libertyville, IL (US); John Sobieski, Burlington, WI (US)

(73) Assignee: IDEAL INDUSTRIES LIGHTING LLC, Sycamore, IL (US)

( * ) Notice: Subject to any disclaimer, the term of this patent is extended or adjusted under 35 U.S.C. 154(b) by 0 days.

(21) Appl. No.: 15/727,178

(22) Filed: Oct. 6, 2017

(65) Prior Publication Data

US 2018/0035506 A1    Feb. 1, 2018

Related U.S. Application Data

(62) Division of application No. 14/618,819, filed on Feb. 10, 2015, now Pat. No. 9,788,378.

(51) Int. Cl.
| | |
|---|---|
| *H05B 33/08* | (2006.01) |
| *F21S 8/08* | (2006.01) |
| *F21V 23/00* | (2015.01) |
| *F21V 23/04* | (2006.01) |
| F21W 131/103 | (2006.01) |
| F21Y 115/10 | (2016.01) |

(52) U.S. Cl.
CPC .......... *H05B 33/0845* (2013.01); *F21S 8/086* (2013.01); *F21V 23/009* (2013.01); *F21V 23/0464* (2013.01); *F21W 2131/103* (2013.01); *F21Y 2115/10* (2016.08); *H05B 33/0809* (2013.01)

(58) Field of Classification Search
CPC ............ H05B 33/0815; H05B 33/0818; H05B 33/0884; H05B 33/0809; H05B 33/0848; H05B 33/0845
USPC ........................................ 315/201, 294, 224
See application file for complete search history.

(56) References Cited

U.S. PATENT DOCUMENTS

| | | | | |
|---|---|---|---|---|
| 8,570,160 B2 * | 10/2013 | Speegle | ................. | G08C 19/02 315/192 |
| 2005/0168934 A1 * | 8/2005 | Wendel | ................. | G11B 33/08 361/679.36 |
| 2007/0228999 A1 * | 10/2007 | Kit | ..................... | H05B 33/0803 315/291 |
| 2008/0290814 A1 * | 11/2008 | Leong | ....................... | F21K 9/00 315/294 |
| 2010/0097002 A1 * | 4/2010 | Shatford | ............ | H05B 33/0803 315/210 |
| 2010/0141175 A1 * | 6/2010 | Hasnain | ................ | H01L 27/153 315/294 |

(Continued)

*Primary Examiner* — Douglas W Owens
*Assistant Examiner* — Syed M Kaiser
(74) *Attorney, Agent, or Firm* — Coats & Bennett, PLLC

(57) ABSTRACT

An outdoor luminaire comprises a housing adapted to be mounted on an outdoor structure, an input disposed in the housing that receives AC power, and at least one rectification element coupled to the input and which produces rectified AC electrical power comprising a plurality of cycles. At least one LED driver circuit is coupled to the at least one rectification element and a plurality of LEDs is coupled to the at least one LED driver circuit. The LEDs are turned on at different points during each of the plurality of cycles and together develop an output level of at least about 2000 lumens.

10 Claims, 7 Drawing Sheets

(56) References Cited

U.S. PATENT DOCUMENTS

| | | | |
|---|---|---|---|
| 2011/0080110 A1* | 4/2011 | Nuhfer | H05B 33/0815 315/291 |
| 2011/0121654 A1* | 5/2011 | Recker | H02J 9/065 307/66 |
| 2011/0121744 A1* | 5/2011 | Salvestrini | H05B 33/0815 315/246 |
| 2011/0133655 A1* | 6/2011 | Recker | H02J 9/02 315/159 |
| 2014/0239809 A1* | 8/2014 | Miskin | H05B 33/0809 315/82 |
| 2014/0327363 A1* | 11/2014 | Tehrani Nejad | H05B 33/0854 315/152 |
| 2015/0091471 A1* | 4/2015 | Shan | B60Q 3/43 315/294 |
| 2017/0006693 A1* | 1/2017 | Raposo | H05B 37/0263 |

* cited by examiner

LED LUMINAIRE

CROSS REFERENCE TO RELATED APPLICATIONS

This present application is a divisional application of U.S. patent application Ser. No. 14/618,819, filed Feb. 10, 2015, entitled "LED Luminaire", owned by the assignee of the present application. The entire contents of this application are incorporated herein by reference.

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to electrical power circuits, and more particularly, to a circuit for operating an LED luminaire.

BACKGROUND

LED-based luminaires have become increasingly popular of late due to the development of high lumen output LEDs that operate at low power. While such luminaires save energy costs, some of the electrical power supplied to the LEDs is converted into heat that may require dissipation to prolong the usable lives of the LED devices. Further, heat is typically developed by other elements, such as one or more driver circuits that develop power of an appropriate magnitude for the LEDs. Inasmuch as the heat developed by the LEDs is directed opposite to the direction the light is emitted, heat dissipation devices are typically disposed in thermal contact with a circuit board on which the LEDs are mounted. In other designs the thermal dissipation device may include the circuit board itself (with or without a heat exchanger in thermal contact therewith), in which case the circuit board may be made of a thermally conductive material, such as metal (aluminum, copper, one or more alloys) and/or a metal and composite material and/or a combination of thermally conductive and non-thermally conductive materials (for example, an alumina substrate with one or more flex connectors).

Still further, other non-heat producing circuit components may be packaged on the same circuit board as the LEDs and the driver circuit(s). The other non-heat producing circuit components include power connection terminals, one or more surge protection devices, a rectification circuit, and the like. Packaging all of the circuit components together results in a modular, all-in-one design that simplifies the process of designing the electrical and mechanical components of the luminaire. The modular design results in some duplication of components when multiple modular packages are used in a luminaire. Further, disposing all of the non-heat producing circuit components on the circuit boards together with the heat producing circuit components results in a relatively large combined size of heat dissipating circuit board being necessary, again, particularly in luminaires employing multiple modular packages, which contributes to cost.

A luminaire as described above may further require the capability of operating on different input voltages, such 120 volts or 240 volts RMS. While circuit designs are known that permit such operation (such as a switched mode power supply circuit that uses a buck regulator, a boost regulator, a buck-boost regulator, etc.), such designs are complex and relatively expensive.

SUMMARY

According to one aspect, an outdoor luminaire comprises a housing adapted to be mounted on an outdoor structure, an input disposed in the housing that receives AC power, and at least one rectification element coupled to the input and which produces rectified AC electrical power comprising a plurality of cycles. At least one LED driver circuit is coupled to the at least one rectification element and a plurality of LEDs is coupled to the at least one LED driver circuit. The LEDs are turned on at different points during each of the plurality of cycles and together develop an output level of at least about 2000 lumens.

Other aspects and advantages will become apparent upon consideration of the following detailed description and the attached drawings wherein like numerals designate like structures throughout the specification.

BRIEF DESCRIPTION OF THE DRAWINGS

FIG. 4A is an isometric view of one of the circuit boards and associated components of FIG. 4;

DETAILED DESCRIPTION

Figure 1:
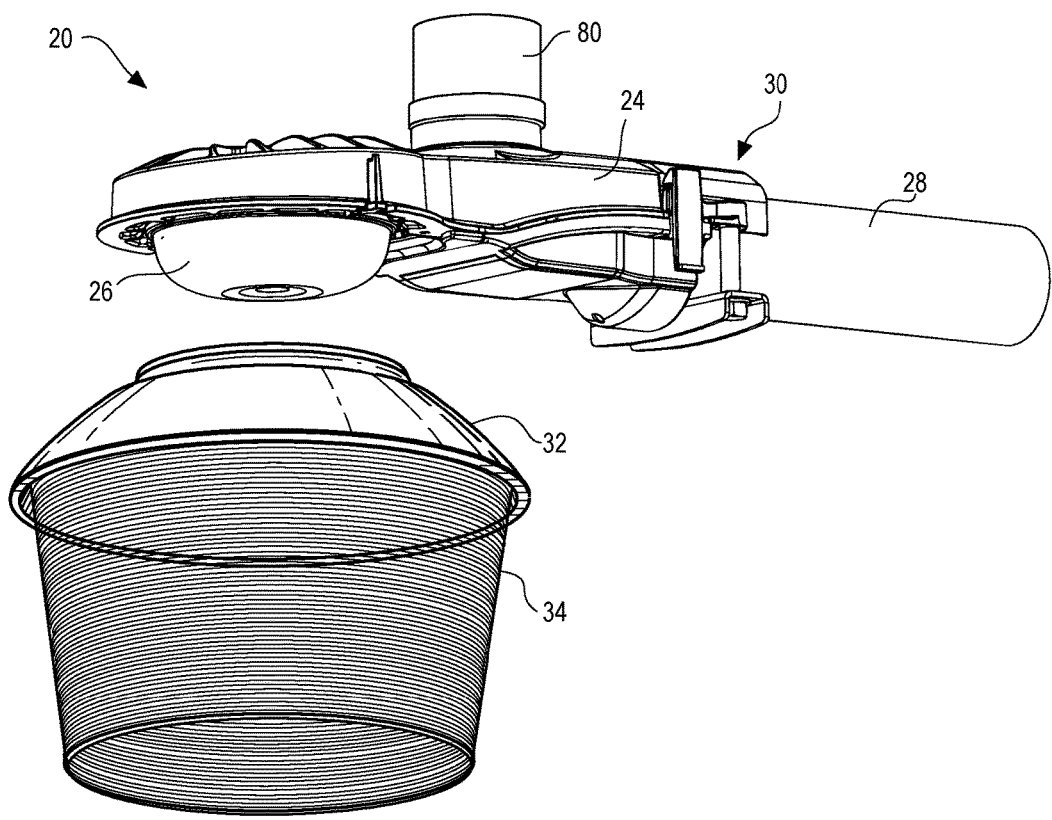
FIG. 1 is an isometric view taken from below of a luminaire incorporating an operating circuit.

Disclosed herein is luminaire 20 for general lighting such as illumination of an open or large enclosed space, for example, in a rural setting, a roadway, a parking lot or structure, or the like. Referring to FIG. 1, the luminaire 20 includes a housing 24 adapted to be mounted on an outdoor structure having a transparent optical member 26. The luminaire 20 may be mounted on a pole or stanchion 28 and retained thereon by a clamping apparatus 30. The luminaire 20 may further include an optional reflector 32 and optional plastic or glass optical element in the form of a transparent shroud 34 secured in any suitable fashion about the optical member 26.

Figure 3:
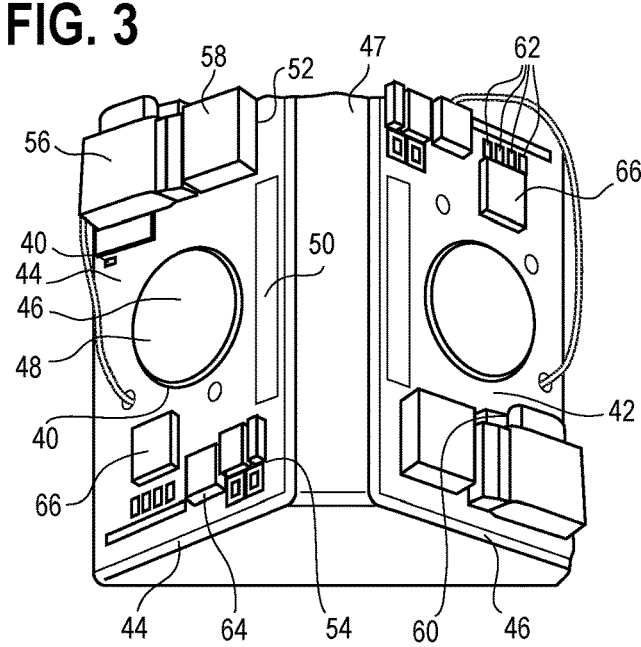
FIG. 3 is isometric view of two prior LED operating circuits and LED modules disposed on two circuit boards.
Figure 3A:
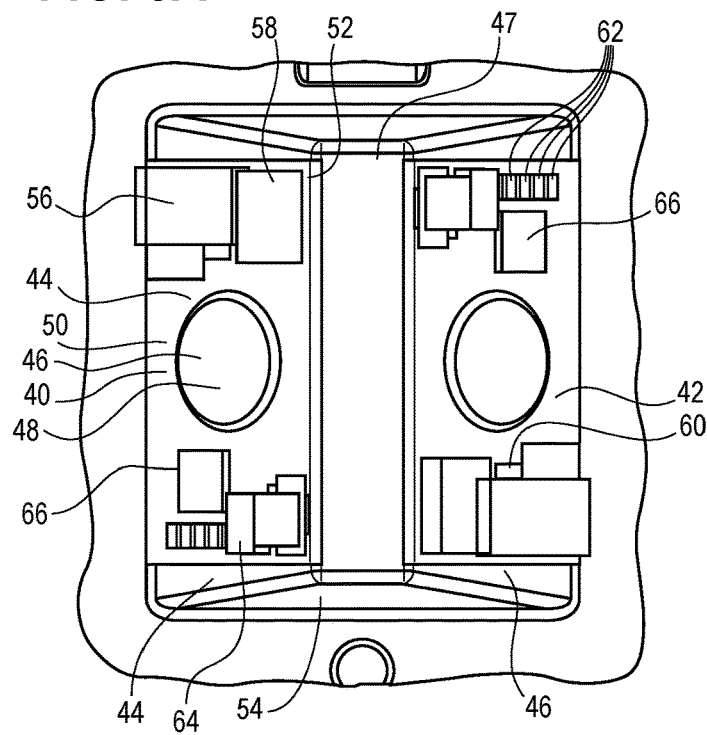
FIG. 3A is a bottom elevational view of the operating circuits of FIG. 3.

Referring next to FIGS. 3 and 3A, a first embodiment of a light generating arrangement is shown comprising first and second lighting modules 40, 42 disposed on inclined side surfaces 44, 46, respectively, of a base 54. The base 54 may be mounted on a mounting surface (not shown) behind the optical member 26. The lighting modules 40, 42 are ideally substantially or fully identical, and hence, only the lighting module 40 will be described in detail herein. Each lighting module is described and shown in U.S. patent application Ser. No. 62/088,375, entitled "Voltage Configurable Solid State Lighting Apparatuses, Systems, and Related Methods", filed Dec. 5, 2014, the disclosure of which is hereby incorporated by reference herein. The lighting module 40 includes a circuit board 44 and an LED enclosure 46 mounted on the circuit board 44 that houses a number of LEDs, such as forty or a different number of separate LED dies and which includes an optical element 48 in the form of a yellow phosphor-coated encapsulant and/or another optical element, such as a lens. If desired, the optical element 48 may comprise another optical element that is coated or uncoated. The LED enclosure 46 is disposed at a central portion 50 of the circuit board 44 and electrical circuit components are disposed at ends 52, 54 of the circuit board 44, although the components may alternatively or in addition be disposed at other locations of the board 44. The circuit components include electrical connection terminals disposed in a connector 56, surge protection component(s) 58, fuse(s) 60, resistors 62, diodes 64, and a driver circuit 66. Other components may also be included as necessary or desirable. The circuit board 44 is made of alumina or another thermally conductive material with flex, FR4, or other insulating material that allows for simplification of pick and place and reflow processes.

Figure 2:
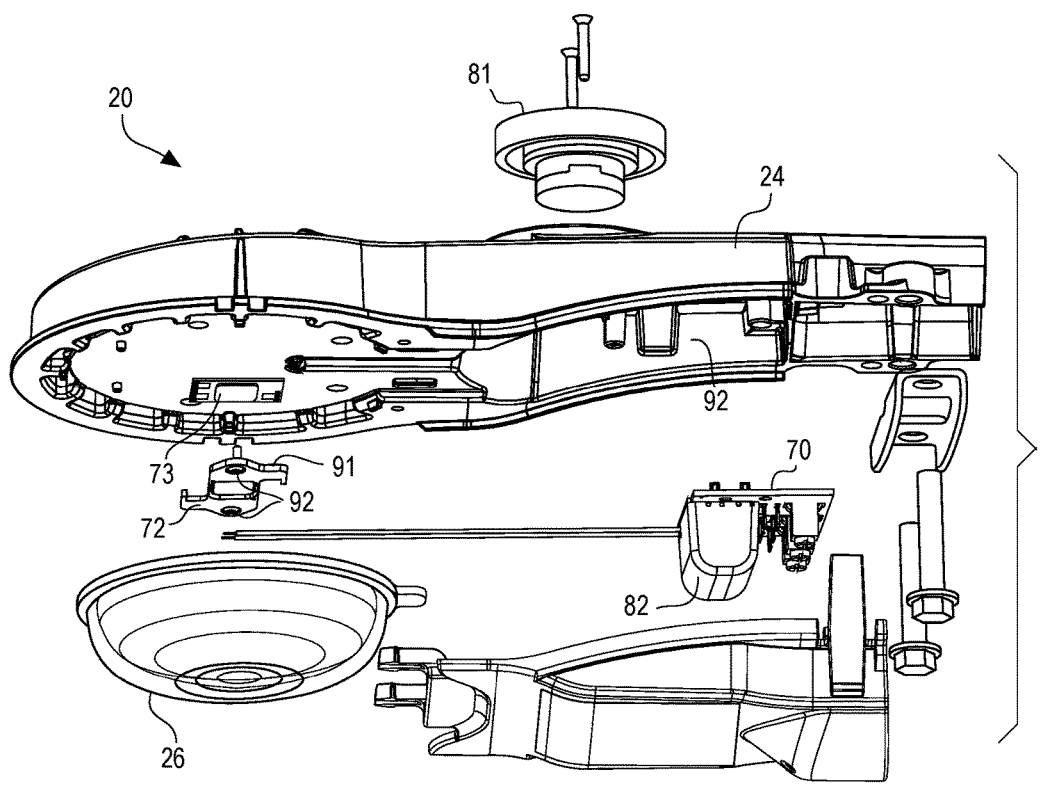
FIG. 2 is an exploded isometric view taken from below of a luminaire incorporating an operating circuit.
Figure 4:
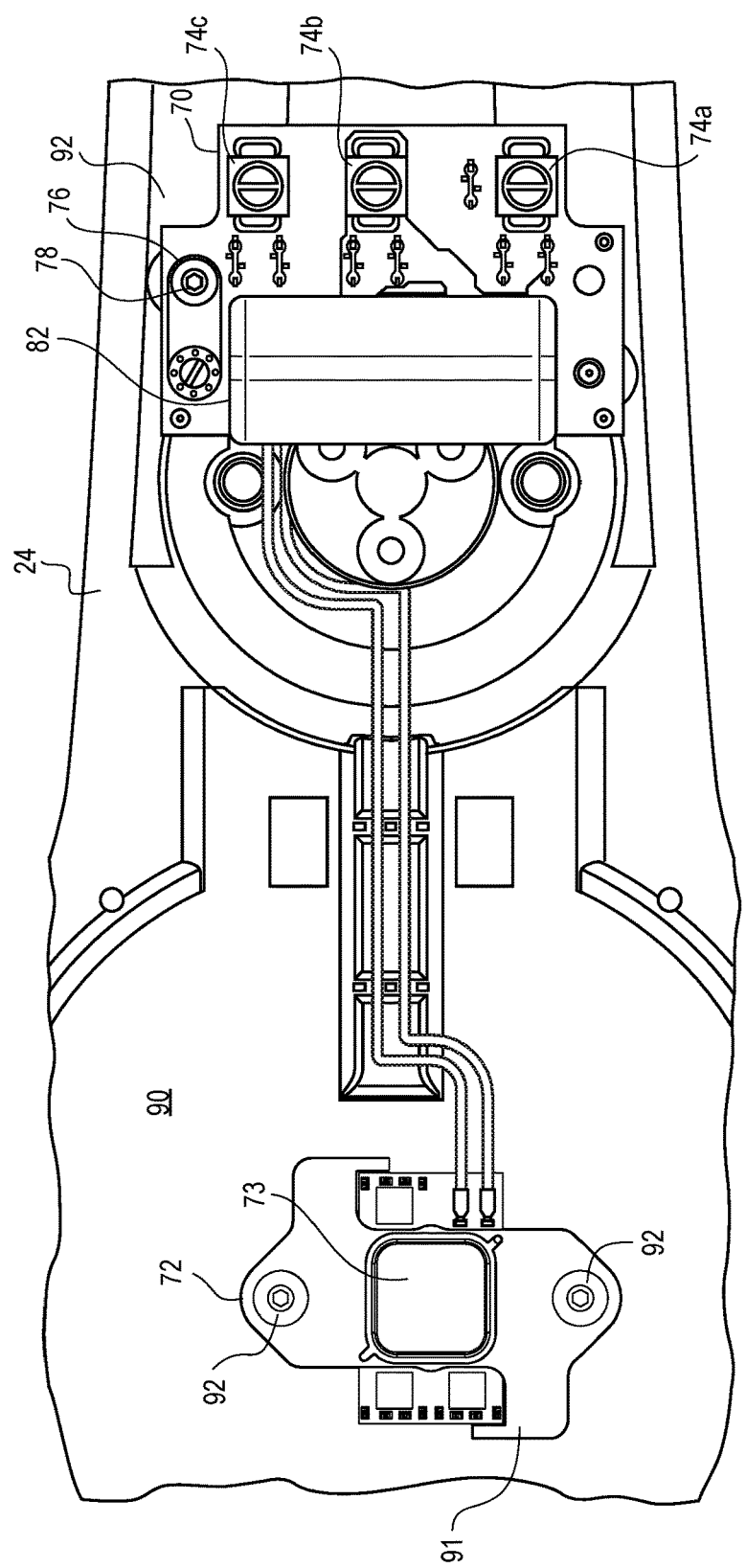
FIG. 4 is a fragmentary bottom elevational view of an LED operating circuit as disposed in the luminaire of FIG. 2.

While the light generating arrangement of FIG. 3 is effective to develop light of sufficient lumen output and desired illumination distribution, it has been found that costs can be reduced by rearranging components onto a combination of circuit boards and integrating all of the LED dies into a single package as seen in FIGS. 2, 4, and 4A. Specifically, in general, non-heat producing components of an LED operating circuit (and/or components that develop little heat) are mounted on a first circuit board 70 (FIG. 4) that need not dissipate substantial amounts of heat. The first circuit board 70 may therefore be made of inexpensive materials, such as FR-4 (a flame resistant fiberglass reinforced epoxy laminate). The remaining, substantial heat-producing components are mounted on a second circuit board 72 made of one or more materials capable of substantial heat dissipation. The second board 72 can comprise any suitable circuit carrier and/or circuit carrying structure not limited to a ceramic-based substrate, for example, alumina ($Al_2O_3$), high reflectivity alumina, or any other suitable ceramic or ceramic-based material. In other aspects, the second board 72 comprises multiple layers of material, where at least one layer is a ceramic or a dielectric base layer. The second board 72 can comprise any suitable material, such as ceramic, aluminum, a composition including aluminum, such as Alanod (e.g., Al and Ag), etc., and combinations thereof having one or more layers, such as traces, provided thereon. In some aspects, the second board 72 comprises a printed circuit board (PCB), a metal core printed circuit board (an MCPCB), a laminate structure having one or more layers connected via adhesive, a flexible printed circuit board ("flextape" PCB) comprising a polymer-like film having at least one conductive layer within one or more layers of a flexible plastic resin (e.g., polyimide, Kapton® from DuPont), and one or more adhesive layers comprising a tape-like adhesive provided on the flextape for easy connection to a ceramic body.

In some aspects, the second board 72 can comprise a ceramic base having one or more (e.g., and optionally flexible) layers adhered thereon as discussed, for example, in commonly assigned and co-pending U.S. patent application Ser. No. 13/836,709, filed Mar. 15, 2013, entitled "Ceramic-Based Light Emitting Diode (LED) Devices, Components, and Methods" and U.S. patent application Ser. No. 13/836, 940, filed Mar. 15, 2013, entitled "Ceramic-Based Light Emitting Diode (LED) Devices, Components, and Methods", both owned by the assignee of the present application and the disclosures of which are hereby incorporated by reference herein.

Further, in an embodiment, the two 40-die LED enclosures are replaced by a single 80-die or even 120-die LED or any other number of LED dies in an enclosure 73 similar or identical to (except as to size) the enclosure 46 mounted on the second circuit board 72.

An operating network or circuit discussed in detail hereinafter operates the LED dies in the enclosure 73 to cause the luminaire 20 to develop a desired distribution of light at a desired lumen output level. Each LED die may be a single white or other color LED (i.e., a single die, packaged in a housing or enclosure or unpackaged), or each may comprise multiple LEDs either mounted separately or together. For example, at least one phosphor-coated or phosphor-converted LED, such as a blue-shifted yellow LED, either alone or in combination with at least one color LED, such as a green LED, a yellow LED, a red LED, etc. may be included. The number and configuration of LEDs may vary depending on a variety of factors.

Specifically, in those cases where a soft white illumination with improved color rendering is to be produced, each LED die or a plurality of such dies may comprise one or more blue shifted yellow LEDs and one or more red LEDs. The LEDs may be disposed in different configurations and/or layouts as desired. Different color temperatures and appearances could be produced using other LED combinations, as is known in the art. In one embodiment, each die comprises a device as described in U.S. patent application Ser. No. 61/948,359, filed Mar. 5, 2014, entitled "Solid State Lighting Apparatuses, Systems, and Related Methods" as developed and manufactured by Cree, Inc., the assignee of the present application. In another embodiment, a plurality of LEDs may include at least two LEDs having different spectral emission characteristics. If desirable, one or more side emitting LEDs disclosed in U.S. Pat. No. 8,541,795, filed Oct. 10, 2005, entitled "Side-Emitting Optical Coupling Device," the disclosure of which is incorporated by reference herein, may be used. In some embodiments, one or more LEDs may be disposed within a coupling cavity with an air gap being disposed between the LED and a light input surface. In any of the embodiments disclosed herein the LEDs preferably have a lambertian or near-lambertian light distribution, although each may have a directional emission distribution (e.g., a side emitting distribution), as necessary or desirable. More generally, any lambertian, symmetric, wide angle, preferential-sided, or asymmetric beam pattern LED(s) may be used.

Specifically, as seen in FIGS. 4 and 4A, the first board 70 includes three power input terminals 74a-74c to which incoming hot, neutral, and ground connections, respectively, can be effectuated. Thus, AC utility power is directly provided to the luminaire 20. The ground power terminal 74c is electrically connected to a bore 76 (FIG. 4) surrounded by an electrically conductive material (e.g., copper). The first board 70 is preferably secured and electrically connected to the housing 24 (FIGS. 1 and 2), which itself may be electrically conductive, by a single screw or other electrically conductive fastener 78 extending through the bore 76. Preferably the single screw is the only device that mounts the first board 70 in the housing 24. This arrangement eliminates the need for a separate wire to ground the conductive housing of the fixture.

Figure 5:
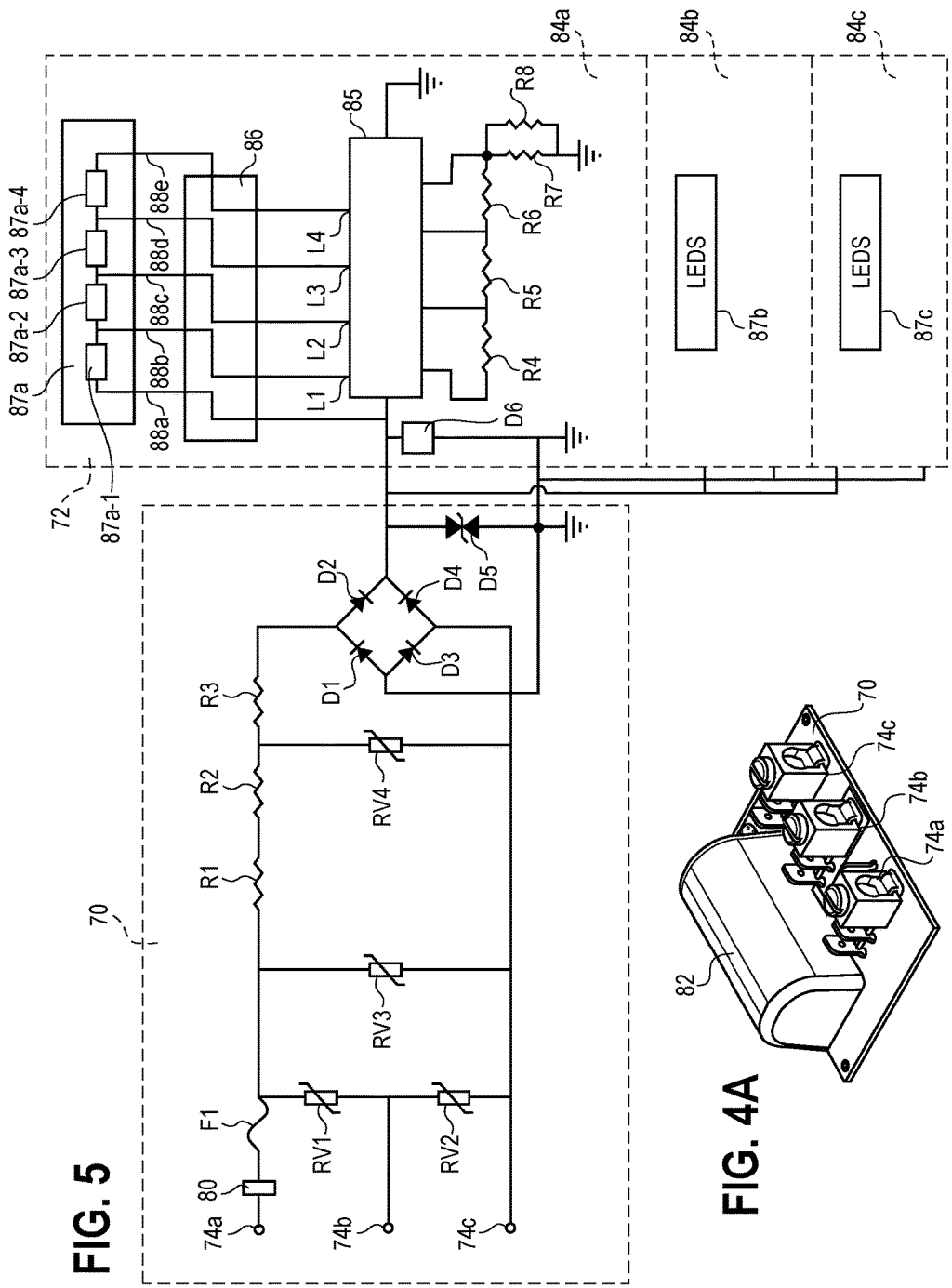
FIG. 5 is a schematic diagram of the operating circuit of FIG. 4.

Referring to the schematic diagram of FIG. 5, also disposed on the first board 70 in one embodiment is a fuse F1, a three-stage surge protection circuit comprising metal oxide varistor devices RV1-RV4, resistors R1-R3, diodes D1-D4 connected in a full bridge rectifier configuration, and a rectifier diode D5 that functions as a protective device. An ambient light sensor 80 (visible in FIG. 1) is mounted in a receptacle 81 (FIG. 2) on the housing 24 and is connected in series with the fuse F1. The ambient light sensor 80 acts as a switch. Specifically, when the level of ambient light drops below a predetermined threshold an electrical path is established by the sensor 80 thereby delivering power to the balance of the operating circuit and causing the luminaire 20 to illuminate.

If desired, a protective plastic cover 82 (FIGS. 2, 4, and 4A) may be disposed over one or more components carried by the first board 70. If desired, some or all of the components on the first board 70 may be potted.

The three-stage surge protection circuit operates to clamp transient voltages across the varistor RV3 to about 600 volts, and further clamps transient voltages across the varistor RV4 to about 300 volts. The voltage across the rectifier diode D5 is clamped to about 230 volts. In accordance with one exemplary embodiment of a voltage supply methodology, a full-wave rectified unidirectional pulsating voltage or other waveform is developed and applied without filtering to the second circuit board 72, so that a switched mode power supply or other power converter and filtering components, such as electrolytic capacitors and inductors, are not needed. While this voltage results in some flickering of LEDs because of turn-on and turn-off of same as noted in greater detail below, such flickering is sufficiently minimal so as not to outweigh the benefits of reduced part count, cost, maintenance, and other benefits.

Further, in at least some prior luminaires, the voltage supply methodology disclosed herein was considered unsuitable for use in applications subject to voltage surges and other voltage variations, such as in outdoor lighting where such variations are commonly experienced. The three-stage voltage clamping afforded by the protection circuit renders the present voltage supply methodology suitable for outdoor use, thereby providing a reliable and inexpensive outdoor luminaire.

The second circuit board 72 includes the LED enclosure 73 and at least one driver circuit 84, and more preferably first, second, and third (or more) driver circuits 84a, 84b, 84c, respectively, that may be identical to one another, and which are coupled together in parallel and supply drive current to first, second, and third separate sets of LEDs 87a, 87b, 87c, respectively, disposed in the enclosure 73. Because the driver circuits 84a-84c are preferably identical to one another, only the driver circuit 84a will be described in detail herein. An LED driver integrated circuit 85 preferably manufactured and sold by Altoran Chips and Systems, Inc. of Santa Clara, Calif., under part number ACS1004 is utilized together with associated components R4-R8 and an LED connection pad 86. If desired, a sequential linear LED Driver manufactured and sold by Supertex Inc. of Sunnyvale, Calif., under part number CL8801 could be used as the integrated circuit 85. The first set of LEDs 87a is coupled to the connection pad 86. The LEDs 87a are further subdivided into four subsets 87a-1, 87a-2, 87a-3, and 87a-4 that are coupled via the connection pad 86 to a full wave rectified waveform developed on a conductor 88a, and conductors 88b, 88c, 88d, and 88e coupled to outputs L1-L4 of the integrated circuit 85 (the manufacturer of the IC 85 designates these outputs as LED1-LED4, respectively). It should be noted that each subset 87a-1 through 87a-4 may include the same or different numbers of LEDs. As seen in FIG. 5A, the subsets 87a-1 through 87a-4 are sequentially turned on and off during each cycle of the full wave rectified waveform developed by the full wave rectifier comprising the diodes D1-D4. Specifically, the first LED subset 87a-1 is on during a period tD1 comprising the full period of the full wave rectified waveform except those portions where the applied rectified voltage is less than the forward turn on voltage for the subset 87a-1 at the beginning and end of each period. The second LED subset 87a-2 is on together with the first LED subset 87a-1 during a shorter interval tD2 of each waveform period when the applied rectified voltage less the voltage drop across the first LED subset 87a-1 exceeds the forward turn on voltage of the second LED subset 87a-2. The third LED subset 87a-3 is on together with the first and second LED subsets 87a-1, 87a-2 during a yet shorter interval tD3 of each waveform period when the applied rectified voltage less the voltage drop across the first and second LED subsets 87a-1, 87a-2 exceeds the forward turn on voltage of the third LED subset 87a-3. Further, the fourth LED subset 87a-4 is on together with the first through third LED subsets 87a-1 through 87a-3 during a still shorter interval tD4 of each waveform period when the applied rectified voltage less the voltage drop across the first through third LED subsets 87a-1 through 87a-3 exceeds the forward turn on voltage of the fourth LED subset 87a-4. This switching is facilitated by the IC 85 via the outputs L1-L4, which short out or otherwise remove drive from those LED subsets when the applied voltage is insufficient to properly energize the LEDs of such subset. As should be evident from the foregoing, one can change the number of individual dies inside one or more of the LEDs and/or change the number of LEDs in each subset to alter the voltage threshold at which different banks of LEDs will turn on, so that efficiency can be optimized.

If desired, one could reduce flickering by biasing the full wave rectified voltage onto a positive DC level (i.e., shifting the waveform in the positive direction) or otherwise modifying the applied waveform to prevent cyclic full or partial turn-off of some or all of the LEDs 87.

Significantly, the second circuit board 72 is substantially smaller than the combined sizes of the circuit boards of the lighting modules 40, 42, and, in fact, the second circuit board 72 may be no larger, or slightly larger or smaller than the circuit board 44 alone. By rearranging the components onto a low-cost circuit board having non-heat producing components and placing heat producing components on a heat dissipating board, and further increasing the number of LED dies in the LED enclosure 73, one can reduce material costs and obtain the same or even increased lumen output. This is because duplicative components are eliminated and the two relatively expensive heat dissipating circuit boards of the modules 40, 42 are replaced by an inexpensive circuit board 70 made of, for example, FR-4 material and a single heat dissipating circuit board 72 of approximately the same size as one of the heat dissipating boards 44.

Referring to FIGS. 2 and 4, the modules 40, 42 shown in FIG. 3 are replaced in the housing 24 by the circuit boards 70, 72 shown in FIG. 4. In the embodiment shown in FIG. 2, the circuit board 72 may be centrally located on a planar surface 90 (the base 47 is not needed and may be omitted) and retained thereon by any suitable means, such as a retainer clip 91 and fasteners 92 and/or an adhesive, whereas the circuit board 70 may be disposed in a compartment 92 of the housing 24 remote from the circuit board 72 and secured therein by any suitable means. The transparent optical member 26 is sealed to the housing 24 covering the circuit board 72 and is retained thereon by an adhesive and/or other means. The housing 24, optical member 26, and associated components of the luminaire 20 are described in greater detail in copending U.S. patent application Ser. No. 14/618,884, entitled "LED Luminaire and Components Therefor," filed contemporaneously herewith, owned by the assignee of the present application and the disclosure of which is hereby incorporated by reference herein.

The luminaire 20 is capable of producing different light distributions depending upon the choice of optical member 26. Different optical members 26 have different shapes to effectuate different illumination distributions. For example, one embodiment of the optical member 26 may be shaped to direct light outwardly and away from an area directly below the optical member 26 to produce an illumination distribution that includes a first extent along an x-axis and a second extent along a y-axis perpendicular to the x-axis, wherein the first extent and the second extent are symmetric x-axis and y-axis, respectively. A further embodiment of the optical member 26 may be shaped to produce a further illumination distribution that includes a first extent along an x-axis and a second extent longer than the first extent along a y-axis perpendicular to the x-axis.

The luminaire disclosed herein is particularly adapted for use in outdoor or indoor general illumination products (e.g., streetlights, high-bay lights, canopy lights, parking lot or parking structure lighting, yard or other property lighting, rural lighting, walkway lighting, warehouse, store, arena or other public building lighting, or the like). According to one aspect the luminaire disclosed herein is adapted for use in products requiring a total lumen output of between about 1,000 and about 12,000 lumens or higher, and, more preferably, between about 4,000 and about 10,000 lumens and possibly higher, and, most preferably, between about 4,000 and about 8,000 lumens. According to another aspect, the luminaire develops at least about 2000 lumens. Further, efficacies between about 75 and about 140 lumens per watt, and more preferably between about 80 and about 125 lumens per watt, and most preferably between about 90 and about 120 lumens per watt can be achieved. Still further, the luminaires disclosed herein preferably have a color temperature of between about 2500 degrees Kelvin and about 6200 degrees Kelvin, and more preferably between about 2500 degrees Kelvin and about 5000 degrees Kelvin, and most preferably between about 3500 degrees Kelvin and about 4500 degrees Kelvin. Further, the optical efficiency preferably may range from about 70% to about 95%, most preferably from about 80% to about 90%. A color rendition index (CRI) of between about 70 and about 80 is preferably attained by the luminaire disclosed herein, with a CRI of at least about 70 being more preferable. Any desired particular output light distribution, such as a butterfly light distribution, could be achieved, including up and down light distributions or up only or down only distributions, etc.

Figure 6:
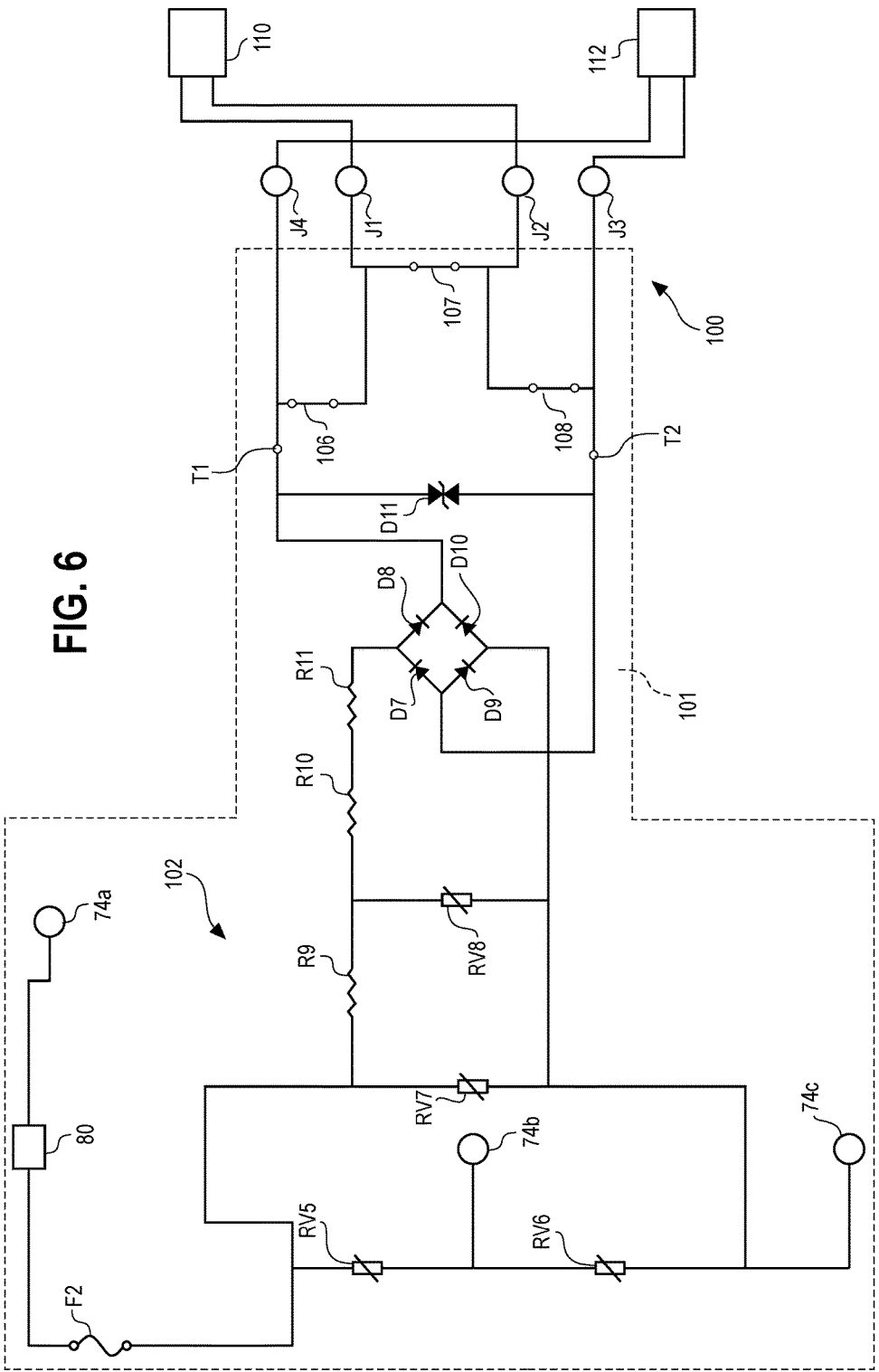
FIG. 6 is a schematic diagram of a portion of an LED operating circuit including an adapter circuit in a first configuration.
Figure 6A:
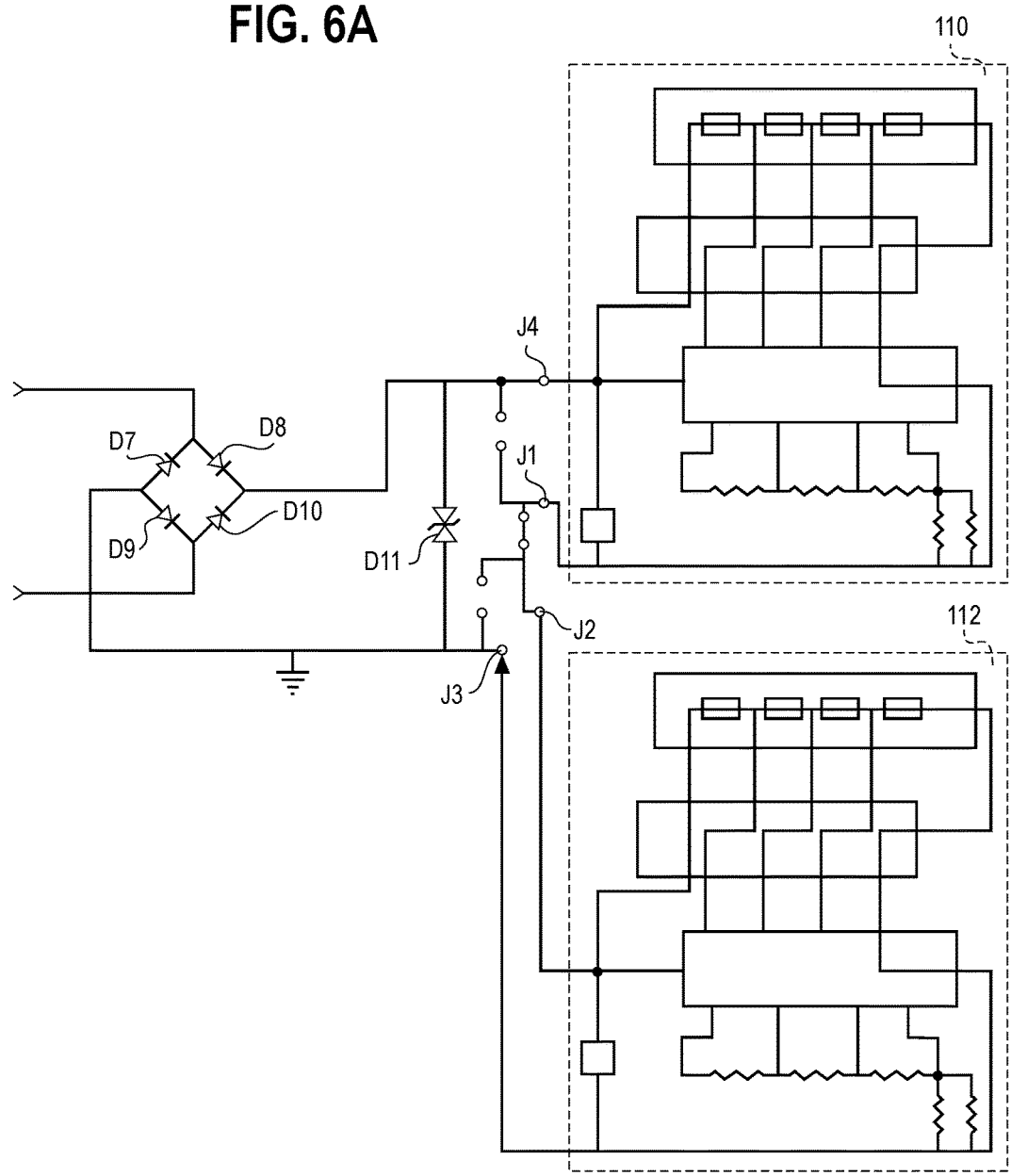
FIG. 6A is a schematic diagram of a portion of an LED operating circuit including an adapter circuit in a second configuration.

Referring to FIG. 6, an optional adapter circuit 100 mounted on a circuit board 101 (shown schematically by dashed lines) may be provided to allow a utilization circuit such as the luminaire 20 to be powered by different electrical supply voltages or other electrical parameter(s). The adapter circuit 100 may be coupled to the components on the circuit board 72. The adapter circuit 100 may receive power from a circuit 102 that operates in a fashion similar or identical to the circuit of FIG. 5 including the sensor 80, a fuse F2, varistors RV5-RV8, resistors R9-R11, diodes D7-D10 connected in a full-wave rectification configuration, and a rectifier diode D11. In the illustrated embodiment, the adapter circuit 100 comprises electrical components, such as jumpers 106, 107, and 108, connectable between input terminals T1 and T2 coupled to the rectifier diode D11 and output or connection terminals J1-J4. Specifically, the rectifier diode D7-10 is coupled across the connection terminals J4 and J3, the jumper 106 is selectively coupled across the connection terminals J4 and J1, the jumper 107 is selectively coupled across the connection terminals J1 and J2, and the jumper 108 is selectively coupled across the connection terminals J2 and J3. When a first magnitude of an electrical input power parameter is to be provided to the luminaire 20, such as an input voltage of 120 volts RMS AC, the jumpers 106 and 108 are provided and connected as shown in FIG. 6, while the jumper 107 is omitted and no component is populated at the location for the jumper 107 on the circuit board 101 (even though the jumper 107 is shown in FIG. 6 for the sake of explanation). Such a configuration results in the terminals J1 and J4 being connected together and the terminals J2 and J3 being connected together. The result is that the full wave rectified voltage is developed between connection terminals J1 and J2 as well as the connection terminals J3 and J4 of the adapter circuit 100. Driver circuits 110 and 112 identical or similar to or different than the driver circuits 84a-84c are coupled to the terminals J1, J2 and to the terminals J3, J4, respectively, so that each driver circuit 110, 112 receives the full wave rectified power. Conversely, as seen in FIG. 6A, when a second magnitude of an electrical input power parameter is to be provided to the luminaire 20, such as an input voltage of 240 volts RMS AC, the jumpers 106, 108 are omitted and no components are populated at the locations provided therefor on the circuit board 101, while the jumper 107 is coupled between the connection terminals J1 and J2. Further, the driver circuit 110 is coupled to the terminals J1 and J4 and the driver circuit 112 is coupled to the terminals J2 and J3. The driver circuits 110 and 112 are thereby coupled in series across the full wave rectification bridge comprising the diodes D7-D10. The LEDs operated by the driver circuits 110, 112 present a nearly resistive load to the full wave rectified voltage developed across the terminals J4 and J3. The result is that the 240 volt RMS full wave rectified waveform is shared equally between the LEDs operated by the driver circuits 110 and 112, and hence, a drop of one-half the full wave rectified voltage occurs between the connection terminals J4 and J1 (due to the presence of the full wave rectified voltage referenced to ground at the connection terminal J4 and one-half of this voltage referenced to ground at the connection terminal J1) and a further drop of the remainder of this voltage occurs between the connection terminals J2 and J3 (due to the presence of one-half the full wave rectified voltage referenced to ground at the connection terminal J2 and zero volts referenced to ground at the connection terminal J3). Thus, the LEDs operated by the driver circuits 110, 112 are operated at the proper voltages in the manner described above in connection with FIG. 5.

As should be evident, the circuits of FIG. 5 or 6 may be used with a number of parallel-connected driver circuits and LED subsets. The circuits of FIG. 5 or 6 could further be used to supply power to a number of series-connected driver circuits and associated LED subsets. The ability to selectively use the circuits of FIG. 5 or 6 with parallel- or series-connected driver circuits and associated LED subsets is facilitated by the adapter circuit 100. For example, 2, 4, 6, etc. parallel-connected driver circuits and associated LED subsets could receive power from a power source via the adapter circuit 100. Alternatively, the adapter circuit 100 could be modified to interconnect more than two driver circuits and associated LED subsets in series, parallel, or combinations of series and parallel configurations. For example, as is readily apparent, one could modify the adapter circuit 100 to include additional jumpers and connection terminals to permit three driver circuits and associated LEDs subsets to be connected together in series. This could be useful where higher supply voltages are standard, as in Canada, which uses a 300 volt RMS AC standard. In such a case each LED subset experiences a nearly identical or substantially equal voltage drop thereacross.

As should also be evident, the adapter circuit 100 permits an assembler/installer to determine a magnitude of electrical power to be supplied to the luminaire and configure the circuit 100 based upon such determination in a simple and convenient fashion. As should also be evident, one or more resistors or other electrical components may be provided to appropriately modify the voltage (or other parameter of electrical power) delivered to the driver circuits, for example, by the full bridge rectifier comprising the diodes D7-D10 and the rectifier diode D11. It may also be noted that some or all of the jumpers 106-108 may, at time of initial assembly, be secured to the circuit board 70 and may comprise easily breakable (i.e., frangible) connections so that the adapter circuit 100 can be readily configured as necessary by breaking and removing selected jumpers from the circuit 100. Any or all of the jumpers 106-108 may be replaced by different electrical component(s) that can be selectively connected or disconnected from the circuit, or that selectively connect or disconnect another component from the circuit, such as resistors or other impedance devices, switches of any kind (manual or controlled), semiconductor or other devices, or the like.

Any of the embodiments disclosed herein may include a power circuit having a buck regulator, a boost regulator, a buck-boost regulator, a SEPIC power supply, or the like, and may comprise a driver circuit as disclosed in U.S. patent application Ser. No. 14/291,829, filed May 30, 2014, entitled "High Efficiency Driver Circuit with Fast Response" by Hu et al. or U.S. patent application Ser. No. 14/292,001, filed May 30, 2014, entitled "SEPIC Driver Circuit with Low Input Current Ripple" by Hu et al., both owned by the assignee of the present application and incorporated by reference herein. The circuit may further be used with light control circuitry that controls color temperature of any of the embodiments disclosed herein in accordance with viewer input such as disclosed in U.S. patent application Ser. No. 14/292,286, filed May 30, 2014, entitled "Lighting Fixture Providing Variable CCT" by Pope et al., owned by the assignee of the present application and incorporated by reference herein.

Further, any of the embodiments disclosed herein may be used in a luminaire having one or more communication components forming a part of the light control circuitry, such as an RF antenna that senses RF energy. The communication components may be included, for example, to allow the luminaire to communicate with other luminaires and/or with an external wireless controller, such as disclosed in U.S. patent application Ser. No. 13/782,040, filed Mar. 1, 2013, entitled "Lighting Fixture for Distributed Control" or U.S. Provisional Application No. 61/932,058, filed Jan. 27, 2014, entitled "Enhanced Network Lighting" both owned by the assignee of the present application and the disclosures of which are incorporated by reference herein. More generally, the control circuitry includes at least one of a network component, an RF component, a control component, and a sensor. The sensor, which may comprise the sensor 80 or any other sensor, may provide an indication of ambient lighting levels thereto and/or occupancy within the room or illuminated area. Such sensor may be integrated into the light control circuitry.

INDUSTRIAL APPLICABILITY

In summary, the present operating circuit is low in cost and yet is capable of delivering equivalent or even increased lumen output, as compared to previous operating circuits. The optional adapter circuit permits the operating circuit to be configured for different electrical power parameter input magnitudes, such as input voltage, in a simple and efficient manner.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:
1. An outdoor luminaire, comprising:
a housing adapted to be mounted on an outdoor structure;
an input disposed in the housing that receives AC power,
   at least one rectification element coupled to the input and which produces rectified AC electrical power comprising a plurality of cycles;
at least one LED driver circuit coupled to the at least one rectification element; and
a plurality of LEDs coupled to the at least one LED driver circuit;
wherein the plurality of LEDs comprises first, second, and third subsets of LEDs that are turned on sequentially at more than two different points in time during each individual cycle of the plurality of cycles and together develop an output level of at least about 2000 lumens; and
wherein each of the first, second, and third subsets of LEDs is turned on for a different length of time during each cycle.

2. The outdoor luminaire of claim 1, wherein the at least one LED driver circuit comprises first and second driver circuits.

3. The outdoor luminaire of claim 2, wherein the first and second driver circuits are coupled together in series.

4. The outdoor luminaire of claim 1, wherein the at least one LED driver circuit comprises first, second, and third driver circuits.

5. The outdoor luminaire of claim 4, wherein the first, second, and third driver circuits are coupled together in parallel.

6. The outdoor luminaire of claim 4, wherein the at least one LED driver circuit comprises at least two driver circuits connected together in series or parallel.

7. The outdoor luminaire of claim 6, wherein an adapter circuit interconnects the at least two driver circuits.

8. The outdoor luminaire of claim 6, wherein the adapter circuit comprises a plurality of jumpers.

9. The outdoor luminaire of claim 8, wherein the luminaire comprises one of a streetlight, a parking structure light, a parking lot light, and an outdoor rural luminaire.

10. The outdoor luminaire of claim 1, wherein the LED luminaire is used in an outdoor application.

\* \* \* \* \*